United States Patent [19]

Muroya et al.

[11] Patent Number: 4,928,458
[45] Date of Patent: May 29, 1990

[54] ENGINE CONTROL DEVICE FOR MOWER

[75] Inventors: Fumio Muroya; Yoshiaki Kotani, both of Saitama, Japan

[73] Assignee: Honda Giken Kabushiki Kaisha, Tokyo, Japan

[21] Appl. No.: 367,582

[22] Filed: Jun. 19, 1989

[30] Foreign Application Priority Data

Jun. 20, 1988 [JP] Japan .............................. 63-81494[U]

[51] Int. Cl.$^5$ ..................... A01D 34/64; A01D 34/82; F02D 9/02; F02D 11/10
[52] U.S. Cl. ....................................... 56/11.8; 56/14.7
[58] Field of Search ....................... 56/11.8, 11.7, 10.8, 56/10.2, 10.5, 11.5, 14.7, 14.8, 16.7, 16.9, DIG. 15

[56] References Cited

U.S. PATENT DOCUMENTS

| 4,159,614 | 7/1979 | Thomas et al. | 56/11.8 X |
| 4,318,266 | 3/1982 | Taube | 56/10.2 |
| 4,432,191 | 2/1984 | Schmitt | 56/11.8 |

FOREIGN PATENT DOCUMENTS 54-16992  7/1979  Japan .
59-73544  5/1984  Japan .

Primary Examiner—Stephen J. Novosad
Attorney, Agent, or Firm—Armstrong, Nikaido, Marmelstein, Kubovcik & Murray

[57] ABSTRACT

A control device in a mower in which an engine output is transmitted to a cutter blade through a coupling of a clutch for performing mowing. A blade engagement switch is provided for sending a drive signal for engaging the cutter blade. A first control device receives the signal and electrically increases a degree of opening of a throttle valve of the engine. A second control device is provided for electrially performing coupling and decoupling of the clutch. A first timer circuit actuates the first control device a predetermined period upon closure of the blade engagement switch. A second timer circuit actuates the second control device to provide coupling of the clutch at a predetermined timing within the predetermined period after closure of the blade engagement switch.

4 Claims, 3 Drawing Sheets

ENGINE CONTROL DEVICE FOR MOWER

BACKGROUND OF THE INVENTION

The present invention relates to a control device in a mower which is driven by an engine.

In a conventional mower in which mowing is performed by a rotation of an engine, engine output is transmitted to a cutter blade through coupling of a clutch. During mowing, the engine is controlled to rotate at a constant rotation speed by means of a governor, etc., since generally no large load variation occurs during the mowing operation.

At the initial start-up period of the cutter blade, i.e. the time immediately after the coupling of the clutch, the engine rotation speed is generally lowered since the load applied to the engine is abruptly increased due to the inertial weight of the cutter blade.

Such abrupt lowering in engine speed due to such load application to the engine is unfavorable for the engine per se, and further, an operator may occasionally have unsatisfactory feeling. Furthermore, there is a problem in that a relatively prolonged time delay may occur until the cutter blade reaches its ordinary rotation speed.

Japanese Utility Model Application Publication No. 54-16992 discloses a technique in which a decrease in engine rotation speed due to the increase in engine load is compensated. According to this technique, idling rotation speed is increased when the requirement for engine output is increased due to initiation of the air cooling conditioning during engine idling.

However, the conventional technique is only available in a case where relatively large load is continuously applied to the engine. Therefore, the technique is not appropriate for solving the problem attendant to the temporary increase in the load as discussed above.

It is therefore, an object of the present invention to provide a control device in a mower in which the decrease in engine rotational speed can be minimized even if the engine load is temporarily increased due to a clutch coupling, which increase in load occurs by the employment of a cutter blade for mowing, and to provide such control device capable of promptly recovering an ordinary engine rotation speed.

SUMMARY OF THE INVENTION

In order to attain the above described object, there is provided in the present invention a control device in a mower in which an engine output is transmitted to a cutter blade through a coupling of a clutch for performing mowing. The device includes a blade engagement switch for sending a drive signal to engage the cutter blade, a first control means for electrically increasing the degree of opening of a throttle valve of the engine, a second control means for electrically performing coupling and decoupling of the clutch, a first timer circuit for actuating the first control means for a predetermined period upon closure of the blade engagement switch, and a second timer circuit for actuating the second control means to provide coupling of the clutch at a predetermined timing within the predetermined period after closure of the blade engagement switch.

Operations of the first and second timer circuits are initiated upon activation of the blade engagement switch, so that the electromagnetic solenoid increases the degree of opening of the throttle valve through the first control means during the predetermined period given by the first timer circuit. The clutch is coupled through the second control means for driving the cutter blade within the predetermined period given by the first timer circuit and after the delay time given by the second timer circuit.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

One embodiment according to this invention will be described with reference to drawings.

Figure 1:
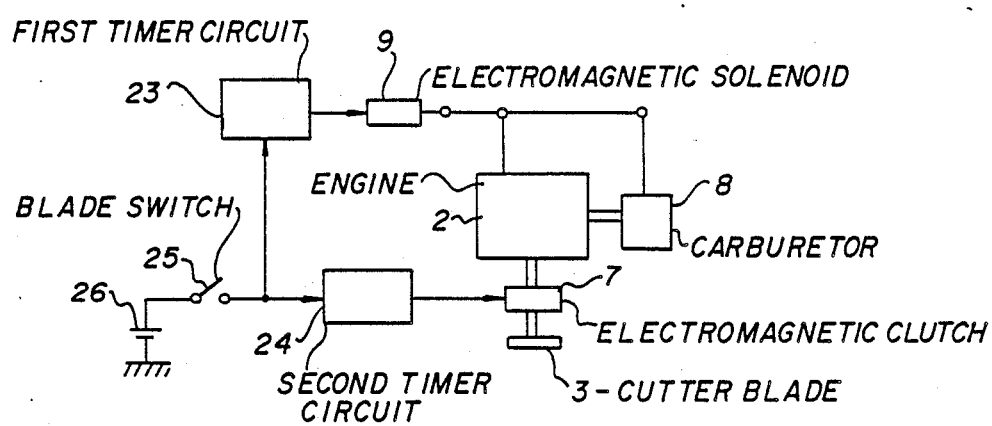
FIG. 1 is a block diagram showing a control system in a mower according to one embodiment of this invention.
Figure 2:
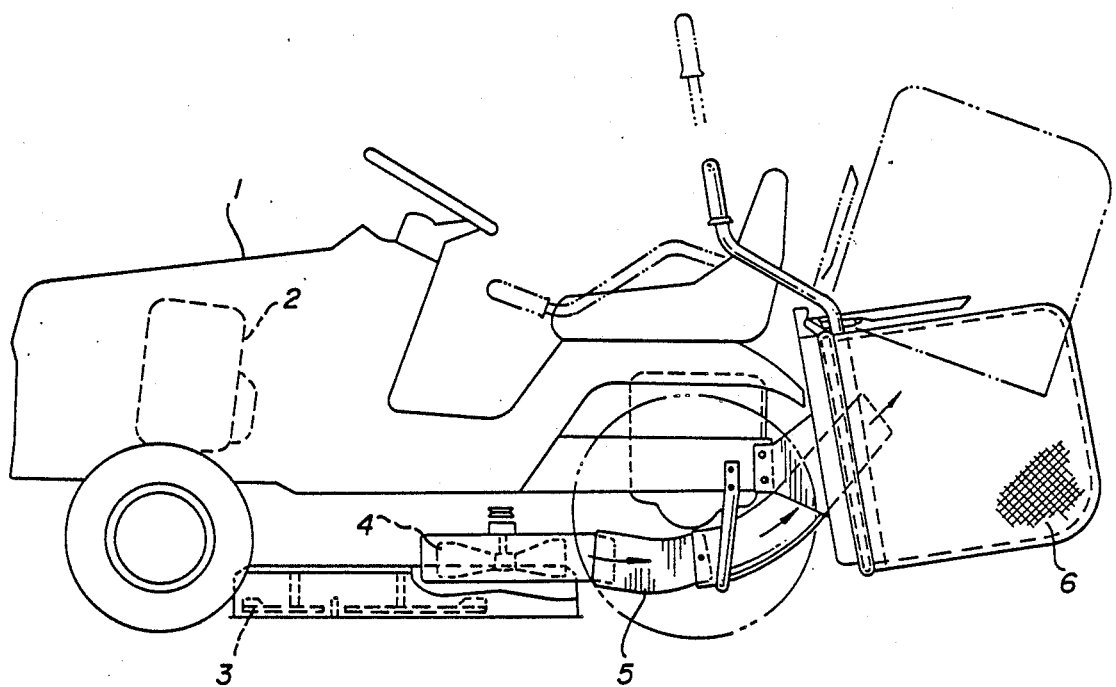
FIG. 2 is a schematic illustration showing a riding type mower suitable for a control device according to this invention.

FIG. 2 shows a riding type mower, in which a cutter blade 3 for mowing or lawn mowing is driven by an engine 2 installed on a mower frame 1. Grass mowed by the cutter blade 3 is delivered to a duct 5 by an impeller 4, and accumulated in a grass bag 6. As shown in FIG. 1, the engine 2 is connected to the cutter blade 3 through the electromagnetic clutch 7 inclusive of a second control means. The degree of opening of a throttle valve 10 (see FIG. 3) in the carburetor 8 is controllable by an electromagnetic solenoid 9 which serves as a first control means.

Figure 3:
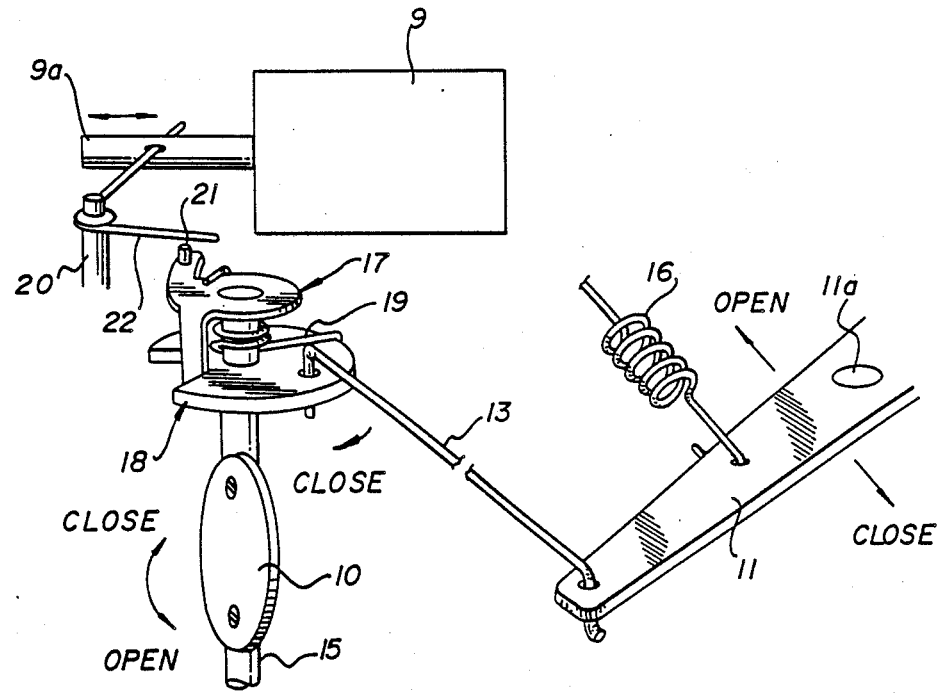
FIG. 3 is a view for description of the operation of a carburetor control.

FIG. 3 shows an adjusting mechanism for the throttle valve 10 of the carburetor 8. In the mechanism, a governor arm 11 is pivotally supported about a pivot shaft 11a. The governor arm 11 has one end (rightward in the FIG. 3) connected to a governor slider of a centrifugal governor mechanism (not shown) or to a rod of an accumulator of a vacuum operating governor mechanism (not shown). The arm 11 has another end connected to a throttle shaft 15 through a governor rod 13. The governor arm 11 is urged toward the throttle valve opening direction by a governor spring 16. A control arm 17 is secured to an upper end portion of the throttle shaft 15. A biasing spring 19 is interposed between the control arm 17 and a control plate 18 which is rotatably provided on the throttle shaft 15. A transmission member 22 is connected to a rotatable engaging rod 20. The transmission member 22 has one end connected to a plunger 9a of the electromagnetic solenoid 9 and has another end abuttable on a pin 21 protruding from the control arm 17.

Therefore, during normal engine rotation, the governor arm 11 is pivoted by the governor mechanism in counterclockwise direction in the FIG. 3 against the biasing force of the spring 16, so that the control plate 18 is rotated in a clockwise direction through the governor rod 13. This rotation force is transmitted to the control arm 17 through the biasing spring 19 for rotating the throttle shaft 15 in a closing direction of the throttle valve 10, so that a control is performed in such a manner that the degree of opening of the throttle valve 10 is in conformance with the rotation speed defined by the governor.

If the blade engagement load is applied to the engine 2, as described later, the electromagnetic solenoid 9 is energized for retracting the plunger 9a. Therefore, the transmission member 22 is pivoted about an axis of the engaging rod 20 in a clockwise direction. By this pivotal movement, one end of the transmission member 22 is brought into abutment with the pin 21 and urges the latter. This urging force rotates the control arm 17 in the counterclockwise direction, so that the throttle shaft 15 directly connected to the control arm 17 is rotated in an opening direction of the throttle valve 10.

As shown in FIG. 1, the first timer circuit 23 connected to the electromagnetic solenoid 9 is adapted for energizing the latter for a predetermined period when the blade engagement switch 25 which sends a drive signal for engagement of the cutter blade 3 is turned ON. That is, the throttle shaft 15 is rotated in a direction for opening the throttle valve 10 when the control arm 17 is rotated in counterclockwise direction in FIG. 3 as described above by energizing the solenoid 9.

The second timer circuit 24 connected to the electromagnetic clutch 7 is adapted for providing coupling of the electromagnetic clutch 7 after a predetermined time delay within the predetermined period preset in the first timer circuit 23, when the blade engagement switch 25 is turned ON. The closing of the blade engagement switch 25 connects a power source 26 to the timer circuits 23, 24, so that the coupling of the electromagnetic clutch 7 is maintained during the entire time that the blade engagement switch 25 is ON.

Operation in accordance with this embodiment will next be described with reference to FIG. 4. When the blade engagement switch 25 is turned ON at a time tl during a running period of the engine 2, the electromagnetic solenoid 9 is energized by means of the first timer circuit 23, so that the throttle valve 10 of the carburetor 8 is moved further in its opening direction. That is, the rotation speed of the engine 2 is increased. Then, at the time t2 after time elapsing period A from the time tl, the electromagnetic clutch 7 is engaged to couple the engine to the blade (clutch coupling state) by means of the second timer circuit 24. As a result, the engine rotation speed is slightly decreased due to the rotational inertia of the cutter blade 3. However, the engine speed is promptly restored, and increased. At the time t3 after the time t2, the predetermined period B stored in the first timer circuit 23 is elapsed. At that time, the electromagnetic solenoid 9 is deenergized, so that the rotation speed of the engine 2 becomes approximately equal to the speed which has been provided at the state prior to the closure of the blade engagement switch 25.

Figure 4:
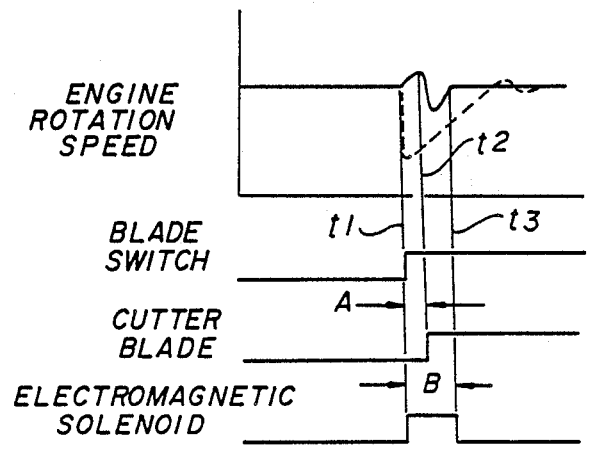
FIG. 4 is a graph for description of the controlling operation in the mower.

In FIG. 4, the broken line represents the decrease in engine rotation speed according to the conventional arrangement, whereas the solid line represents variation in engine rotation speed using the control device according to this invention. It is apparent from the graph that the variation is greatly improved in the present invention.

In view of the foregoing, according to the present invention, in a control device in the mower in which the engine output is transmitted to the cutter blade through the coupling of the clutch for mowing operation, there are provided the blade engagement switch for sending a drive engagement signal to engage the cutter blade, the first control means for electrically increasing degree of opening of the throttle valve of the engine, the second control means for electrically performing coupling and decoupling of the clutch, the first timer circuit for actuating the first control means for a predetermined period upon closure of the blade engagement switch, and the second timer circuit for actuating the second control means to provide coupling of the clutch at a predetermined timing within the predetermined period after closure of the blade engagement switch. With this structure, engine rotation speed can be temporarily increased during the predetermined period before and immediately after the coupling of the clutch, and accordingly, decrease in engine rotation speed due to inertial weight of the cutter blade can be reduced. As a result, unsatisfactory driving feeling can be obviated, and normal mowing operation can be promptly achieved because of the prompt recovering of the engine rotation speed, thus enabling comfortable mowing.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control device in a mower in which an engine output is transmitted to a cutter blade through a coupling of a clutch for performing mowing, the control device comprising: a blade engagement switch for sending a drive signal for engaging the cutter blade; a first control means for electrically increasing a degree of opening of a throttle valve of the engine; a second control means for electrically performing coupling and decoupling of the clutch; a first timer circuit for actuating the first control means for a predetermined period upon closure of the blade engagement switch; and a second timer circuit for actuating the second control means to provide coupling of the clutch at a predetermined timing within the predetermined period after closure of the blade engagement switch.

2. The control device according to claim 1, wherein the first control means comprises a solenoid which forcibly moves the throttle valve toward its opening direction in response to an output signal from said first timer circuit.

3. The control device according to claim 1 wherein the second control means comprises an electromagnetic clutch disposed at a power transmission path along which the engine output is transmitted to the cutter blade 4. The control device according to claim 2 wherein the second control means comprises an electromagnetic clutch disposed at a power transmission path along which the engine output is transmitted to the cutter blade.

* * * * *

UNITED STATES PATENT AND TRADEMARK OFFICE
CERTIFICATE OF CORRECTION

PATENT NO. : 4,928,458

DATED : May 29, 1990

INVENTOR(S) : MUROYA et al

It is certified that error appears in the above-identified patent and that said Letters Patent is hereby corrected as shown below:

On the cover page, Item [73], "Honda Giken Kabushiki Kaisha" should read --Honda Giken Kogyo Kabushiki Kaisha--.

Signed and Sealed this

Tenth Day of December, 1991

*Attest:*

HARRY F. MANBECK, JR.

*Attesting Officer*  *Commissioner of Patents and Trademarks*